United States Patent
Torres et al.

(10) Patent No.: US 10,735,324 B2
(45) Date of Patent: Aug. 4, 2020

(54) BOTTLENECK BANDWIDTH AND ROUND-TRIP PROPAGATION TIME (BBR) CONGESTION CONTROL WITH RANDOM EARLY DETECTION (RED)

(71) Applicants: Rob Torres, New Market, MD (US); Jun Xu, Takoma Park, MD (US); Vivek Gupta, Clarksburg, MD (US)

(72) Inventors: Rob Torres, New Market, MD (US); Jun Xu, Takoma Park, MD (US); Vivek Gupta, Clarksburg, MD (US)

(73) Assignee: Hughes Network Systems, LLC, Germantown, MD (US)

(*) Notice: Subject to any disclaimer, the term of this patent is extended or adjusted under 35 U.S.C. 154(b) by 61 days.

(21) Appl. No.: 15/805,989

(22) Filed: Nov. 7, 2017

(65) Prior Publication Data
US 2019/0140952 A1    May 9, 2019

(51) Int. Cl.
*H04L 12/801* (2013.01)
*H04L 12/851* (2013.01)
*H04L 29/08* (2006.01)

(52) U.S. Cl.
CPC .......... *H04L 47/12* (2013.01); *H04L 47/10* (2013.01); *H04L 47/24* (2013.01); *H04L 67/28* (2013.01)

(58) Field of Classification Search
CPC ................................ H04L 47/12; H04L 47/24
See application file for complete search history.

(56) References Cited

U.S. PATENT DOCUMENTS

| | | | |
|---|---|---|---|
| 7,688,731 B2* | 3/2010 | Haumont | H04L 12/5602 370/235 |
| 8,203,956 B1 | 6/2012 | Milliken | |
| 9,515,942 B2* | 12/2016 | Lipman | H04L 47/25 |
| 2013/0136000 A1* | 5/2013 | Torres | H04L 47/27 370/235 |
| 2013/0279334 A1* | 10/2013 | Xu | H04W 24/04 370/235 |
| 2016/0226783 A1* | 8/2016 | Roskind | H04L 47/25 |
| 2018/0091431 A1* | 3/2018 | Burbridge | H04L 43/10 |

FOREIGN PATENT DOCUMENTS

WO        2016091292 A1        6/2016

OTHER PUBLICATIONS

International search report for counterpart PCT Application No. PCT/US2018/057839.
Philips, C et al., "ATM and the future of telecommunication networking", Electronics and communication engineering journal, Institution of Electrical Engineers, London, GB, vol. 11, No. 3, Jun. 1, 1999 (Jun. 1, 1999), pp. 108-124, XP000913195, ISSN: 0954-0695, DOI: 10.1049/ECEJ:19990301.

* cited by examiner

Primary Examiner — Yemane Mesfin
Assistant Examiner — Henry Baron
(74) Attorney, Agent, or Firm — Capitol City Techlaw; Jasbir Singh

(57) ABSTRACT

A method for controlling congestion of traffic, by one of one or more User Terminals (UTs), traversing an intermediate node, the method comprising: associating one or more traffic flows of a priority to one of the one or more UTs; detecting a traffic congestion for the priority; performing Random Early Detection (RED) congestion control for the priority to relieve the traffic congestion; selecting, for the priority, a User Terminal (UT) with a perceived delay greater than a high threshold; and controlling, by priority, the traffic flows associated with the selected UT.

18 Claims, 3 Drawing Sheets

```
When t>1
For i=1,...,N, N is the number of users
  Evaluate $D_i(t)$ and $D_{LT,i}(t)$;

% for every period of $T_{check-BBR}$ (300ms by default), check BBR status
If Mod(t, $T_{check-BBR}$)==0
  If BBR_Timer_release(i,t-1)==0
  % perform BBR selection
    %If Delay conditions are met
    IF [ $P_{Drop\_LT}^{avg}(t) \geq P_{drop,TH}$ AND $D_i(t) >= d_{BBR,1}$ AND $D_{LT,i}(t) >= d_{BBR,1}$ ] OR [ $D_i(t) >= d_{BBR,2}$ AND
$D_{LT,i}(t) >= d_{BBR,2}$ ]
    BBR_Candidate (i,t)=1;
    Else
    BBR_Candidate(I,t)=0;
    End
    If BBR_Candidate(i,t)==1
    BBR_Pacing_factor(i,t)=1-pacing_step_down;
    BBR_Timer_release(i,t)=BBR_Time_out+ Random Number;
    Random Number=integer of Uniform distribution of [-L, L], L=10 by default.
    Else
    BBR_Pacing_factor(i,t)=BBR_Pacing_factor(i,t-1);
    BBR_Timer_release(i,t)= BBR_Timer_release(i,t-1);
    End
  Else %i.e., BBR_Timer_release(i,t-1)>0
    IF $D_{LT,i}(t) <= d_{BBR,Tar}$
    Set BBR_Timer_release(i,t)=0;
    BBR_Pacing_factor(i,t)=min(1, BBR_Packing_factor(i,t-1)*(1+pacing_step_up));
    IF BBR_Pacing_factor(i,t)==1
    BBR_Candidate(i,t)=0;
    End
  Else
    BBR_Pacing_factor(i,t)=BBR_Pacing_factor(i,t-1);
    BBR_Timer_release(i,t)= BBR_Timer_release(i,t-1)-1;
    BBR_Candidate(i,t)= BBR_Candidate(i,t-1);
  End
 End % end of i.e., BBR_Timer_release(i,t-1)==0

Else % i.e., Mod(t, $T_{check-BBR}$ )~=0
    BBR_Pacing_factor(i,t)=BBR_Pacing_factor(i,t-1);
    BBR_Candidate(i,t)= BBR_Candidate(i,t-1);
  If BBR_Timer_release(i,t-1)>=1
   BBR_Timer_release(i,t)= BBR_Timer_release(i,t-1)-1;
  Else
   BBR_Pacing_factor(i,t)=min(1, BBR_Packing_factor(i,t-1)*(1+pacing_step_up));
    IF BBR_Pacing_factor(i,t)==1
    BBR_Candidate(i,t)=0;
    End
  End
End % end of Mod(t, $T_{check-BBR}$ )==0
End % for loop, i=1,...,N.
```

FIG. 3

BOTTLENECK BANDWIDTH AND ROUND-TRIP PROPAGATION TIME (BBR) CONGESTION CONTROL WITH RANDOM EARLY DETECTION (RED)

FIELD

The present teachings disclose methods and systems to deal with congestion control for a Bottleneck Bandwidth and Round-trip propagation time (BBR) Transmission Control Protocol (TCP) data flow in conjunction with other flow control systems, such as, a Random Early Detection (RED) system, a window size control system or the like. In some embodiments, a BBR TCP flow traverses a connection flow controlled by a RED congestion control. The present teachings may be used on an intermediate network node that obfuscates an actual bottleneck link from a sender.

In some embodiments, an intermediate node may be a satellite gateway such that a BBR TCP flow traverses a satellite communication link subject to RED congestion control by the satellite provider. In some embodiments, the BBR TCP flow transmits the bulk of traffic to a Very Small Aperture Terminal (VSAT).

In some embodiments, an intermediate node may be a cellular base station such that a BBR TCP flow traverses a cellular link subject to RED congestion control. In some embodiments, the BBR TCP flow transmits the bulk of traffic to a User Terminal (UT) receiving service by the cellular link.

BACKGROUND

Recently Google initiated and proposed a new congestion control for Transmission Control Protocol (TCP) flows. The new congestion control known as the BBR is based on measuring two parameters that characterize a path, namely, Bottleneck Bandwidth and Round-trip propagation time (BBR). In BBR, a sender measures the bottleneck bandwidth and Round Trip Time (RTT) via received acknowledgments (ACKs). Data inflight of the sender is essentially based on the product of the measured bandwidth and RTT. In addition, BBR paces the sending rate using the in-flight data amount and the RTT.

Conventional TCP congestion control for the in-flight data of the send is based on a window size determined by both the sender and the receiver. The sender shrinks the window size if it sees missing ACKs; ACKs that are presumably due to packet drops on the path as a result of congestion. Based on such a feature of the sender, intentionally dropping a packet at an intermediate node could alleviate congestion on the path. Random Early Detection (RED) is based on such a mechanism. US Patent Publication Number 2013/0136000 incorporated herein by reference in its entirety discloses a conventional teaching.

BBR differs from conventional TCP congestion control in the sense that it is not sensitive to a packet drop. Although BBR alters a sending rate based on received ACKs, unlike conventional TCP congestion control, randomly dropping a single packet does not affect BBR's sending rate. In contrast, conventionally, a missing ACK could essentially cut a transmission rate of the sender by half. In the present teachings, data flows using BBR are referred to as BBR traffic while data flows not using BBR are referred to as non-BBR traffic.

A High Throughput Satellite (HTS) may use a congestion control scheme such as RED. RED is applied at an Internet Gateway (IPGW) of the HTS to flow control the incoming traffic to the Performance-Enhancing Proxy (PEP). The IPGW randomly drops packets of all flow sessions to push back TCP traffic during congestion. This is assuming all TCP sources follow the conventional congestion control. However, when a significant amount of BBR traffic is received and ACKed by the IPGW, during congestion, the BBR traffic could accumulate at the IPGW (since random dropping would not affect its sending rate) and cause issues to non-BBR traffic. As BBR traffic does not push back due to a packet drop, RED would be triggered more frequently when BBR traffic takes more buffer space, resulting in less non-BBR incoming traffic, and consequently lowering a throughput of non-BBR flows compared to BBR flows.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings address flow control of BBR traffic, or combined BBR and non-BBR traffic at an intermediate node intended to improve the end-to-end performance of the TCP protocol, for example, by hiding or sheltering a relatively slow link in the communications path from a sender to a receiver at or behind a User Terminal (UT). Examples of such an intermediate node include, but are not limited to, the IPGW, an aggregator, a base station, a performance enhancing proxy, or the like.

The present teachings disclose simultaneous flow control for BBR and non-BBR traffic in a RED based congestion control configuration. The present teachings coexist with RED congestion control intended to pace the ACKs of a BBR flow such that the sending rate of the BBR traffic can be reduced. In some embodiments, the BBR congestion control is per priority per UT basis. During congestion, when the average RED rate is non-zero (greater than a threshold), the flows of a particular priority of a UT with a higher delay may be selected. ACKs of the selected flows are paced such that the ACK produced data rate is less than the actual throughput provided by the data flow scheduler. As a result, for a BBR flow, the sender sends a smaller rate based on the received ACKs. On the other hand, during congestion, the ACKs are not paced for all traffic flows. In general, the present teachings run on top of or alongside RED. In some embodiments, the present teachings utilize output from RED as an input. In some embodiments, RED is independent and there is no impact or change to the existing congestion control. For a selected priority of a UT, flow control could consist of both BBR and non-BBR flows, and the present teachings work for this case. In some embodiments, there is no performance impact on non-BBR flows even if the present teachings are triggered to apply on non-BBR traffic during congestion.

A method for controlling congestion of traffic, by one of one or more User Terminals (UTs), traversing an intermediate node. The method including: associating one or more traffic flows of a priority to one of the one or more UTs; detecting a traffic congestion for the priority; performing Random Early Detection (RED) congestion control for the priority to relieve the traffic congestion; selecting, for the priority, a User Terminal (UT) with a perceived delay greater than a high threshold; and controlling, by priority, the traffic flows associated with the selected UT.

An intermediate node to control congestion of traffic, by one of one or more User Terminals (UTs), traversing the intermediate node. The intermediate node including: a flow scheduler to associate one or more traffic flows of a priority to one of the one or more UTs, and to detect a traffic congestion for the priority; a Random Early Detection (RED) congestion control to perform congestion control for the priority to relieve the traffic congestion; a BBR Congestion Control to select, for the priority, a User Terminal (UT) with a perceived delay greater than a high threshold; and a control module to pace, by priority, the traffic flows associated with the selected UT.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be considered to be limiting of its scope, implementations will be described and explained with additional specificity and detail through the use of the accompanying drawings.

FIG. 3 illustrates exemplary pseudo code for selecting a BBR candidate and determining a pacing factor (especially on pacing down)

Figure 1:
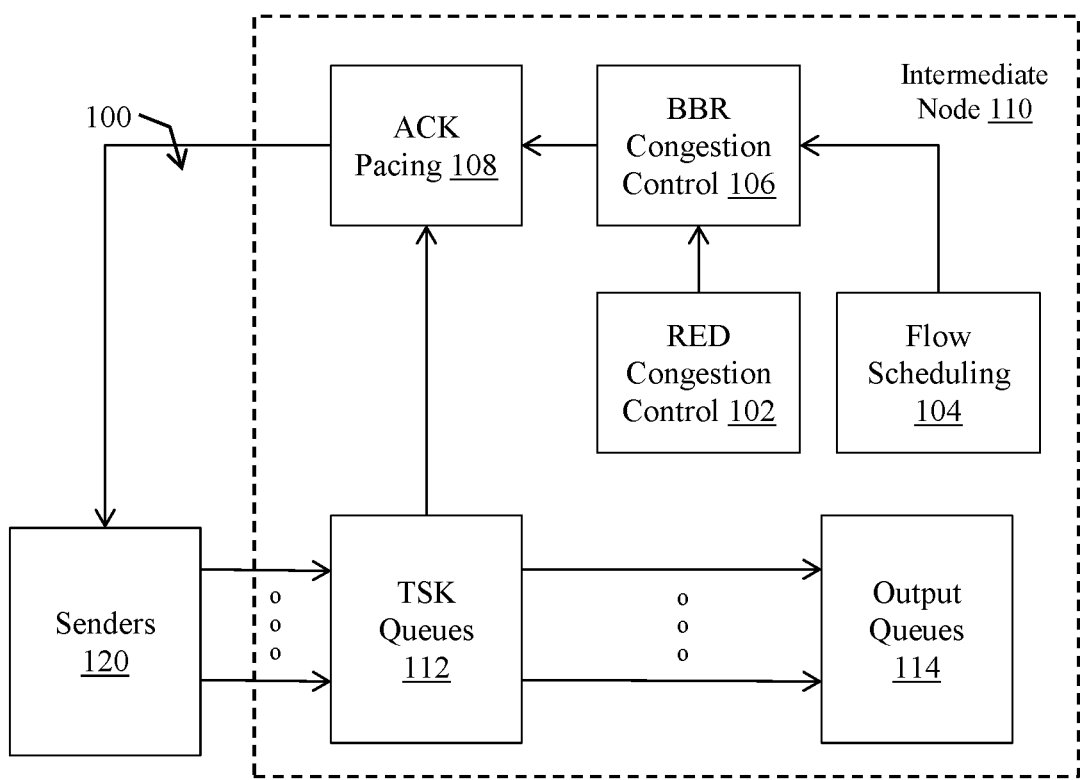
FIG. 1 illustrates a system of congestion control for a Bottleneck Bandwidth and Round-trip propagation time (BBR) flow of a User Terminal (UT), according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity but rather denotes the presence of at least one of the referenced item. The use of the terms "first," "second," and the like does not imply any particular order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

The present teachings disclose congestion control with RED and BBR. BBR traffic can be flow controlled during congestion inline with RED based congestion control. Particularly, the present teachings disclose a method for selecting a BBR traffic candidate and perform pacing thereupon. The present teachings also disclose a method for calculating or determining an ACK rate when performing BBR congestion control.

Congestion control includes aspects of identification and control. In some embodiments, control of congestion may be performed by scaling the incoming traffic, for example, by pacing of Acknowledgements (ACKs), to shape the incoming traffic rate to emulate the bottleneck link that has been obfuscated, or the like. The present teachings disclose a pacing of ACKs embodiment in detail including disclosing a calculation of a pacing factor and a throughput by priority. In some embodiments, a shaping factor may be based on calculations of the pacing factor. In some embodiments, the shaping factor may be the pacing factor. The shaping factor may be used to shape the incoming traffic of a congested User Terminal (UT) to emulate the calculated throughput by priority.

This approach works in conjunction with but independently from RED. In some embodiments, only when RED is triggered, BBR congestion control kicks in by selecting BBR candidates and pacing ACKs for the BBR candidates. The present teachings may be performed on a per priority per UT basis. For a selected priority of a UT, the UT's traffic flows may include both BBR and non-BBR flows, and the present teachings work for this case. In exemplary embodiments, there is no performance impact on non-BBR flows even if the ACK pacing is triggered to apply on them during congestion.

FIG. 1 illustrates a system of congestion control for a Bottleneck Bandwidth and Round-trip propagation time (BBR) flow of a User Terminal (UT), according to various embodiments.

In FIG. 1, a system 100 providing congestion control for BBR traffic includes a sender 120, an intermediate node 110, a Random Early Detection (RED) congestion control module 102, a flow scheduler module 104, a BBR congestion control module 106, an ACK pacing module 108, task queues 112 and output queues 114. When incoming data packets arrive at the intermediate node 110, they are immediately acknowledged (ACKed) to the sender 120 and queued in the TSK queues 112. The RED module 102 may continuously measure a perceived delay of all data queued in an intermediate node. If the perceived delay is greater than a threshold, a dropping probability is calculated. The intermediate node 110 applies the dropping probability to packets arriving at the task queues 112. If a packet is dropped, a respective sender 120 will be missing an ACK. By randomly dropping packets, the intermediate node 110 signals the senders 120 to reduce the data rate. Since dropping is randomly applied to all packets, the dropping ensures data flows are scaled down in rate with equal chances. In response to the missing ACK, for a non-BBR traffic flow, the respective sender 120 will reduce its transmission rate.

The missing ACKs are not effective to reduce a transmission rate of a BBR traffic flow sender 120. BBR traffic does not scale down rate due to a missing ACK. During congestion, the BBR traffic may keep on taking buffer at the TSK queues 112, thus more frequently triggering the RED congestion control 102 to scale down non-BBR traffic. The uneven effectiveness of the RED congestion control 102 ultimately compresses non-BBR throughput, resulting in an unfair bandwidth usage among UTs. In some embodiments, BBR taking excessive buffer may be avoided by pacing BBR flows based on an average throughput of the flows provided by the flow scheduler 104. However, as the network of the system 100 is dynamic, the throughput rate of a UT can change over time. Flow control based on the average throughput of the flows may cause undesired remaining data of BBR traffic in queues. As such, the present teachings disclosed a more comprehensive approach that integrates RED congestion control and scheduling.

The BBR congestion control module 106 may include a common buffer, such as the ACK pacing module 108, to queue ACK packets. The TSK queues module 102 may send ACK packets to the ACK pacing module 108, instead of directly or immediately returning the ACK packets back to senders 120. The BBR congestion control module 106 may determine when and how to pace the ACKs such that the overall congestion control is running safely and smoothly.

In the present teachings, generally, an average (long-term) RED dropping probability is considered as an indicator of consistent congestion. When the long-term RED probability is greater than a threshold, the system 100 is determined to be in consistent congestion. In exemplary embodiments, when consistent congestion is detected, BBR traffic needs to be interfered with. As RED is generally imposed at per priority with different delay thresholds, in exemplary embodiments BBR congestion control may also be imposed at per priority. The BBR congestion control 106 may be continuously provided (by measuring, calculating, receiving, or the like) an average throughput rate, and a total queued data amount per priority of each UT as inputs, for example, by the flow scheduler 104. The BBR module 106 may continuously evaluate a perceived delay per priority of each UT. During congestion of the system 100 (or in some embodiments even when the system is uncongested), when a UT's perceived delay of a priority is greater than a threshold, the BBR congestion control 106 may request pacing of the ACKs of that particular UT/flow. Since each ACK includes a record of a packet size, the ACK pacing module 108 may flow control or limit an identified flow to a certain data rate by summing the packet sizes in the associated ACKs.

For the average throughput rate of a priority for the UT, the BBR congestion control 106 may reduce pacing or pace down such that the pacing rate is smaller than or in line with the throughput rate of a downstream resource. In some embodiments, the present teachings disclosed a gradual pacing up for recovering a paced rate, for example, when the system becomes uncongested. When uncongested, the BBR congestion control 106 may completely relieve pacing, meaning ACKs are not queued. When congested, the ACKs may be queued per priority for UT by the ACK pacing module 108. Generally pacing down applies to all priorities, for example, Interactive, Streaming, and Bulk. The pacing of a BBR flow for a UT can be temporary, meaning pacing will be finished once a delay target is reached.

In exemplary embodiments, the system 100 includes a RED based congestion control module 102. RED may be an indicator of overall system congestion. In addition to RED, individual delay of each UT at a priority level may be evaluated. Thus BBR congestion control 106 may be operated per priority level for a single UT. UTs having a greater delay than a high threshold are considered a BBR flow candidate and may be subject to a Pacing Down operation for decreasing an ACK queue size as a result of reducing an incoming rate. The high threshold is set to be greater than a minimum delay threshold for triggering RED. Once a UT is in a Pacing Down process, the UT's ACK rate will be slowed until the perceived delay is smaller than a low threshold. The low threshold is generally below the minimum delay threshold for RED. In some embodiments, a pacing timeout is used when Pacing Down. In Pacing Down, the ACK rate is smaller than the average throughput rate provided by the scheduler 104. Pacing Down of a UT generally is only triggered when the RED congestion control 102 indicates a consistent congestion. In exemplary embodiments, consistent congestion is determined based on the condition that the long-term RED probability is larger than a threshold. In an exceptional case, Pacing Down may be triggered when a UT's perceived delay of a priority is much greater even when the system 100 is uncongested. When the Pacing Down of a UT is finished and the system 100 is still congested, the ACK rate may be set to equal to the average throughput rate; if the system 100 is not congested, the ACK rate save will not be held, meaning ACKs are immediately released.

Figure 2:
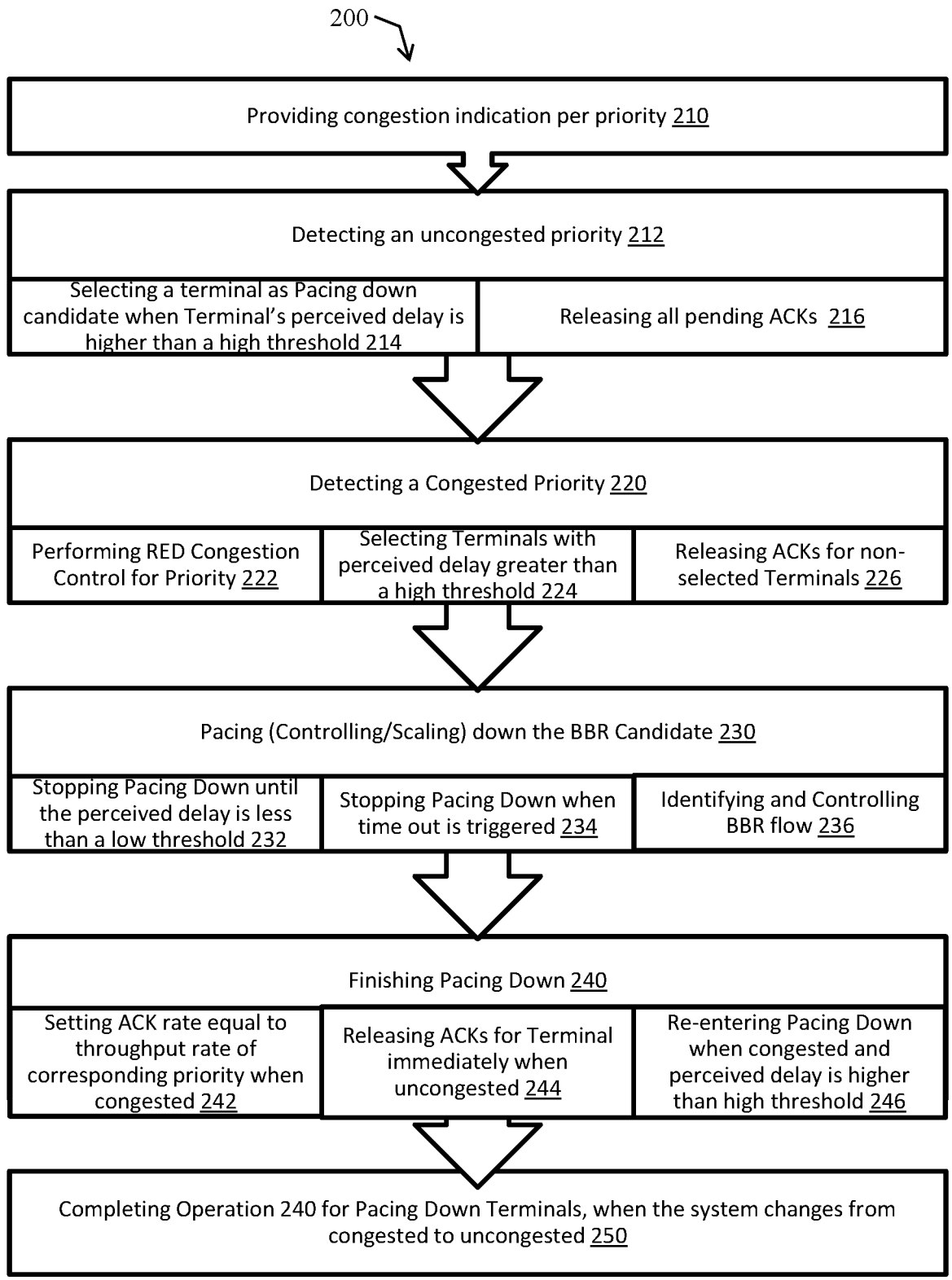
FIG. 2 illustrates a flowchart of an exemplary method for congestion control of a Bottleneck Bandwidth and Round-trip propagation time (BBR) flow, according to some embodiments.

FIG. 2 illustrates a flowchart of an exemplary method for congestion control of a Bottleneck Bandwidth and Round-trip propagation time (BBR) flow, according to some embodiments.

A method 200 for congestion control of a BBR flow includes an operation 210 for providing congestion indication per priority. The method 200 may include an operation 214 for selecting a UT as a Pacing down candidate when the UT's perceived delay is greater than a high threshold. This will likely be an exceptional case. The method 200 may include an operation 216 for releasing all pending ACKs for an uncongested priority.

The method 200 may include an operation 220 for detecting a congested priority. In operation 220, BBR congestion control is per priority level or in other words if congestion is detected at the Streaming priority (and not for Bulk), then the detecting of the congestion and subsequent remedies such as Pacing Down are for the flows or ACKs associated with the Streaming priority. The method 200 may include an operation 220 for performing RED Congestion Control for the priority. The method 200 may include an operation 224 for selecting a BBR candidate with perceived delay greater than a high threshold. In some embodiments, the method 200 may include an operation 226 for Releasing ACKs for non-BBR candidate UTs when priority is congested.

The method 200 may include an operation 230 for pacing (or controlling or scaling) down the BBR candidate. Pacing Down may include pacing ACKs such that the ACK rate is smaller than the average throughput rate of a UT. Operation 230 for Pacing down may include an operation 232 for stopping the Pacing Down until the perceived delay is smaller than a low threshold. Operation 230 for Pacing down may include an operation 234 for stopping the Pacing Down when a timeout is triggered. Operation 230 for Pacing down may include an operation 236 for identifying and controlling a BBR flow for the traffic flows associated with the BBR candidate. In operation 236, the controlling may control only the ACKs associated with the identified BBR flow.

The method 200 may include an operation 240 for finishing pacing down. Operation 240 may include an operation 242 for setting the ACK rate equal to the throughput rate of the corresponding priority when the system is congested. Operation 240 may include an operation 244 for releasing the ACKs when the system is uncongested. Operation 240 may include an operation 246 for re-entering Pacing Down when the system is congested and perceived delay is greater than a high threshold. When Pacing Down is finished, if the system is congested (as indicated by RED), the ACK rate is set equal to the throughput rate (of the corresponding priority); if the system is uncongested, the ACK is released immediately.

In some embodiments, the method 200 may include an operation 250 for completing the operation 240 for Pacing Down UTs, when the system changes from congested to uncongested.

le;2qPresently there is no explicit indication (e.g., something in the header of a BBR packet) to indicate whether a data flow is BBR or not. As such a non-BBR may be selected for pacing if the criteria are met. However, there should no or a minor performance impact to non-BBR traffic if Pacing Down is imposed during congestion. Without limitation, this occurs as the non-BBR traffic follows RED congestion control. When RED is triggered, the input rate of a UT is reduced while the throughput rate may keep the same, thus fewer ACKs will be generated. Setting an ACK rate as a certain fraction of throughput rate may happen to be a similar result that RED brings.

The present teachings also disclose a system and method for determining a BBR candidate and its associated pacing factor, and determining an ACK rate with priorities. In exemplary embodiments, some of the input variables needed are provided by other modules, particularly, the long-term RED dropping probability, the total backlog and the average throughput rate of a UT. These can be obtained from the RED congestion control 106 and the flow scheduler 104 modules.

Overview

Denote t as the time tick for BBR congestion control. In exemplary embodiments, the time tick is 20 ms by default. Denote $P_{Drop\_LT}^{(k)}(t)$ the long-term average RED dropping probability for traffic priority k, k=1, ..., K, where K is the number of priorities for an intermediate node. In exemplary embodiments, this RED dropping probability may be an existing variable for a RED congestion control, for example, at a satellite gateway, an intermediary node, a PEP, or the like.

In some embodiments, BBR congestion control may focus at a priority level of a flow. RED is a per priority indicator with different thresholds on delays. In general, the throughput at the UT level is reasonably consistent and comparable among different UTs with different rate plans. One can reasonably expect BBR traffic with a consistent input rate to cause a longer task queue, and as such one can infer that the throughput rate per priority is also consistent when BBR is present. To provide BBR congestion control per priority, the BBR congestion control derives, calculates or measures the estimated delay per priority for a UT and uses different delay thresholds for different priorities.

The flow scheduler 104 may collect an average throughput per priority for each UT and for the UT as a whole by summing up the traffic demand across priorities. The equations derived in the following are generic, applicable to both priority and UT. The equations drop the discussion of the priority index for convenience. BBR congestion control may be performed by calculating the following variables.

Denote $A_i(t)$, i=1, ..., N, where N is the number of UTs, A is the recorded throughput rate at time t, typically based on an exemplary 20 ms frame, or 100 ms interval, whichever is available. If both intervals are available, a throughput that matches closest to the time tick used by the flow control module is preferable, for example, a 20 ms frame may be preferable as time tick t is 20 ms). The smoothed average throughput rate may be expressed as $A_{EMA,i}(t)=\alpha_1 \cdot A_i(t-1)+(1-\alpha_1) \cdot A_{EMA,i}(t-1)$, i=1, ..., N, where the smoothing factor $\alpha_1$ has an exemplary default value of $\alpha_1=0.02$.

Similarly, let $Q_i(t)$, i=1, ..., N, be the backlog of a UT i at time t. The backlog may be obtained by taking the most recent snapshot of the backlog. The smoothed average backlog at time t for UT i may be expressed as $Q_{EMA,i}(t)=\alpha_2 \cdot Q_i(t)+(1-\alpha_2) \cdot Q_{EMA,i}(t-1)$, i=1, ..., N, where the smoothing factor $\alpha_2$ has an exemplary default value of $\alpha_2=0.1$. In some embodiments, the RED module may calculate and provide the smoothed throughput and backlog values.

Let a perceived average delay be denoted by $D_i(t)$ for UT i, i=1, ..., N, N is the total number of UTs, which can be expressed as $$D_i(t) = \frac{Q_{EMA,i}(t)}{A_{EMA,i}(t)},$$

$A_{EMA,i}(t) \neq 0$, i=1, ..., N.

Let a perceived longer-term average delay be denoted by $D_{LT,i}(t)$, by averaging $D_i(t)$ over a certain period $T_{win-BBR}$. The default value is $T_{win-BBR}$=50 (20 ms units)=1000 ms. So $D_{LT,i}(t)$=mean[$D_{LT,i}(t-T_{win-BBR}+1:t)$]. When t<$T_{win-BBR}$, do averaging over the past time.

Determining BBR Candidate and Pacing Factor

In some embodiments, criteria for determining a BBR candidate and pacing factor may include:

If the long-term RED dropping probability is larger than a dropping rate threshold and a UT's both short and long-term perceived delays of a priority are larger than delay threshold 1, then this UT is a BBR candidate.

Independently, if a UT's short-term and long-term delays are both larger than delay threshold 2, then this UT is a BBR candidate.

Given a BBR candidate, the pacing factor may be equal to or less than one is calculated. When entering Packing Down procedure, the less than one pacing factor is adopted until either the perceived delay reaches the target or times out. The pacing factor is applied to the ACK rate.

After reaching target or timeout, the pacing factor is set back to one.

BBR candidates are at the priority level, for example, a UT can be BBR candidate for Streaming, Bulk, or both. Pacing at each priority is independent.

Exemplary status variables to reflect each UT's state with regard to determining BBR candidates, Pacing Down rates, etc. are illustrated in the following table and are per priority.

| Variable | Type | Description | Initial value | Range |
|---|---|---|---|---|
| BBR_Candidate(i,t) | Int | for UT#i at time t, if determined as BBR, set the value as 1; otherwise, 0. | 0 | 0 or 1 |
| BBR_Timer_release(i,t) | Int | when UT #i enters BBR Pacing Down, this variable counts down from BBR_Time_out to 0 | 0 | Between BBR_Time_out and 0 (somehow randomized to avoid synchronization) |
| BBR_Pacing_factor(i,t) | real | when use #i is in pacing, the ACK rate = BBR_Pacing_factor(i,t) * Avg_throughput_rate of UT #i at time t | 1 | [0, 1] |

Let denote $P_{drop,TH}^{(k)}$ a threshold to determine congestion at priority k, k=1, . . . , K, K=3, meaning, for example, Interactive, Streaming, and Bulk. Exemplary default values for the priorities may be $P_{drop,TH}^{(k)}$=0.002 for k=1, . . . , K. Let $d_{BBR,1}^{(k)}$ and $d_{BBR,2}^{(k)}$ be the delay thresholds 1 and 2 for priority k. As there is no cross priority operation, the present teachings drop (k) for demonstration convenience. The above criteria can be expressed as (for priority k):

IF [$P_{Drop\_LT}^{avg}(t) \geq P_{drop,TH}$ AND $D_i(t) >= d_{BBR,1}$ AND $D_{LT,i}(t) >= d_{BBR,1}$] OR [$D_i(t) >= d_{BBR,2}$ AND $D_{LT,i}(t) >= d_{BBR,2}$]

A UT i may be a BBR candidate at priority (k) that may be stored in an exemplary variable, BBR_Candidate (i,t)=1.

Let $P_{Drop\_LT}^{avg}(t)$ be the derived average long-term RED drop probability at time t for a priority. As such, $d_{BBR,1} = k_1 * D_{RED,Min}$ and $d_{BBR,2} = D_{RED,Min} + k_2 * (D_{RED,Max} - D_{RED,Min})$.

Let $k_1$ be a configured parameter with an exemplary default value of $k_1$=1.25. The exemplary default value for $k_2$ maybe 0.75 or 0.80. Since the RED min and max delays are defined in RED algorithm, the present teachings separately configure $d_{BBR,1}$ and $d_{BBR,2}$ based on the formula.

The BBR candidate check may be performed periodically, with a default configured interval of $T_{check-BBR}$=15 units=300 ms. If a UT is determined to be a BBR candidate, the UT will enter Pacing Down procedure until either the perceived delay is less than a threshold, or a preconfigured timeout. This time-out is denoted as BBT_Time_out with an exemplary default value of BBR_Time_out=100 units=2000 ms. BBR_Time_out may be different for different priorities, and such may be a per priority configuration parameter.

In exemplary embodiments, in every BBR checking period, if an identified BBR UT is in Pacing Down state, and when the evaluated long term delay $D_{LT,i}(t)$ is smaller than a delay target, this UT may exit Pacing Down state. The pacing down finishing module may be expressed as:

```
         D_LT,i (t) d_BBR,Tar
IF          <=
Set BBR_Timer_release(i,t)=0;
BBR_Pacing_factor(i,t)=min[PF_max, BBR_Packing_factor(i,t-
       1)*(1+pacing_step_up)];
   If BBR_Pacing_factor(i,t)==1
   BBR_Candidate(i,t)=0;
   End
End
```

The delay target may be denoted as $d_{BBR,Tar} = k_3 \cdot D_{RED,Min}$, where exemplary values for $k_3$ are 0.75 or 0.80. PF_max may be the maximum pacing factor with an exemplary default value of PF_max=1. PF_max may be applied to all priorities.

The present teachings use a few status variables to reflect each UT's state with regard to BBR candidate determination, Pacing Down, etc. These variables are:

BBR_Candidate(i,t): for UT # i at time t, if determined as BBR, set the value as 1; otherwise, 0. Initial value=0.

BBR_Timer_release(i,t): when UT # i enters BBR Pacing Down, this variable counts down from BBR_Time_out. If the delay target is achieved, this value is set to zero. When The initial value=0.

BBR_Pacing_factor(i,t): when use # i is in pacing, the ACK rate=BBR_Pacing_factor(i,t)*Avg_throughput_rate of UT # i at time t. The initial value=1.

FIG. 3 illustrates exemplary pseudo code for selecting a BBR candidate and determining a pacing factor (especially on pacing down).

A UT's BBR status may be only temporary in the sense that it is BBR only when it runs a BBR session.

Pacing ACK Queues

Figure 4:
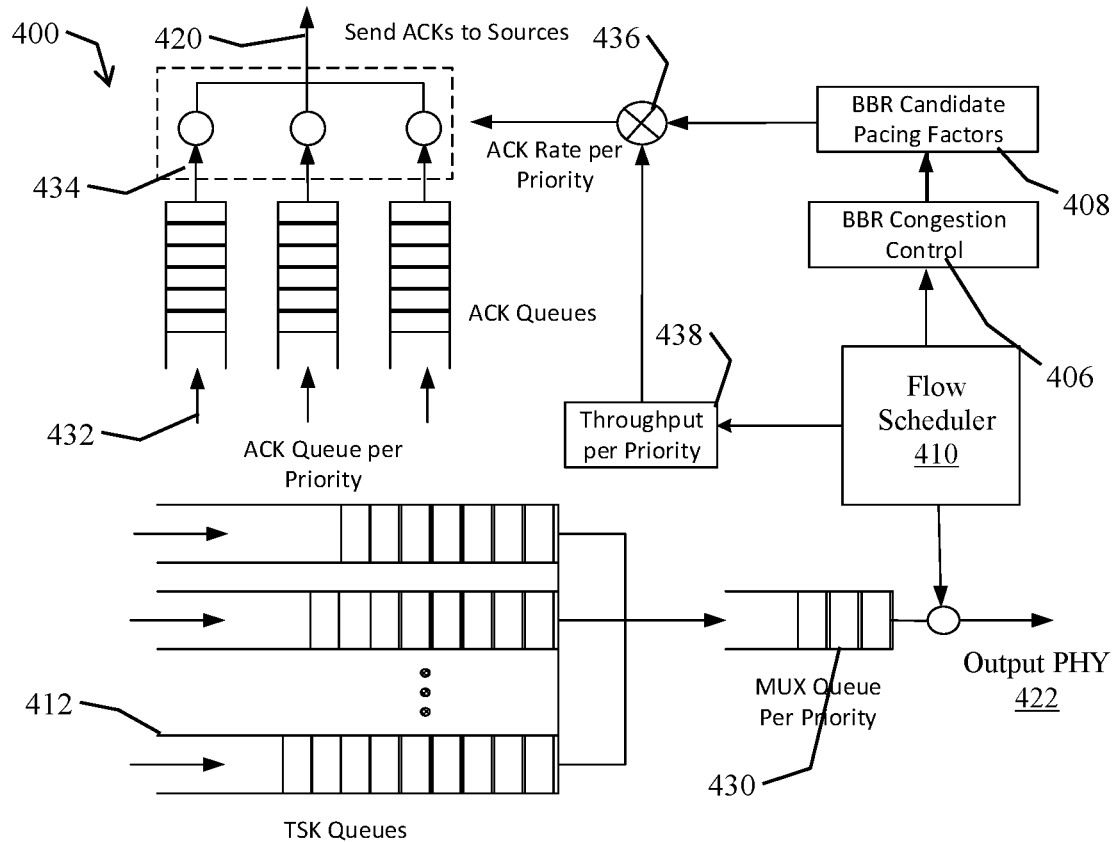
FIG. 4 illustrates an exemplary system for providing pacing on ACK queues according to various embodiments.

FIG. 4 illustrates an exemplary system for providing pacing on ACK queues according to various embodiments.

FIG. 4 illustrates a system 400 for applying a pacing factor to ACKs. In exemplary embodiments, a sending rate of BBR traffic in the system 400 is based on a received ACK rate for each priority.

In the system 400, an incoming packet may be received and queued in TSK queues 412. A TSK may handle one session flow. As such, there can be multiple TSK queues 412 for one UT. For each priority, corresponding packets from TSK queues 412 may be multiplexed per priority in a MUX queue 430. In exemplary embodiments, a flow scheduler 410 performs a dequeuing operation at the MUX queue 430 to forward a dequeued packet to a destination output 422, for example, a satellite link, a wireless link, a terrestrial line, or the like. The scheduler 410 may evaluate each UT's throughput rate per priority and as a whole. The scheduler 410 may also evaluate a queueing profile, such as queue size per priority, RED variables, etc., and feed the needed variables to BBR congestion control 406. Based on the inputs from the scheduler 410, the BBR congestion control 406 determines BBR candidates and corresponding pacing factors 408 for each priority of a UT.

The system 400 may maintain ACK queues 432, one queue per priority, e.g., Interactive, Streaming and Bulk. In exemplary embodiments, if a UT is not determined as a BBR candidate for a priority, then no ACK queueing is needed for this non-candidate priority. That means the ACK packets come and go without buffering in the ACK queues 432. If a UT is determined as BBR candidate for a priority, then the ACK packets are queued in ACK queues 432 and dequeuing is performed based on the pacing factors 408 and a throughput rate 438 for the priority at an ACK sender 434 back to a sender/source 420 of the incoming packet. In exemplary embodiments, the throughput rate 438 per priority may be set by the flow scheduler 410. In some embodiments, if RED congestion control (not shown) is not triggered by the flow scheduler 410, then BBR congestion control is not performed (unless a very exceptional case when the perceived delay of a UT is very big). When RED congestion control is triggered at a priority (for example, at a system level as compared to a UT level), the pacing factor 408 is derived for a BBR candidate of a certain priority, and the ACK rate 436 is determined by the UT's throughput rate at that priority multiplied by the corresponding pacing factor. The maximum value for the pacing factor is one, thus during pacing, the ACK rate would be less than or equal to the throughput rate.

Let $V_k$ be the data volume of a UT labeled by the ACK in priority k, k=1, . . . , K, K is the number of priorities. In exemplary embodiments, K=3 corresponding to Interactive, Streaming, and Bulk. In exemplary embodiments, there may be no pacing for real-time and management packets. We illustrate without an index of the UT as pacing is per UT. Let $PF_k(t)$ and $A_k(t)$ denote the pacing factor and throughput at time t for priority k, k=1, . . . , M, M=3. The timing on an ACK rate may not necessarily be the same as the BBR congestion control. A smaller timing unit may reduce the ACK delay due to pacing. If the timing for BBR congestion control is 20 ms, then ACK pacing can be 20 ms, 10 ms, 5 ms, or the like. Let $R_k(t)$ be the ACK pacing rate, then $R_k(t) = PF_k(t) \cdot A_k(t)$. $A_k(t)$ is the actual averaged throughput rate, not the allocation or the bandwidth based on weight. So summing up $A_k(t)$ may give the total throughput rate of a UT. So the ACK rate pacing procedure is given below:

When RED is not triggered, no pacing for the ACK queue.

When RED is triggered, at each time interval, evaluate the volume of each ACK queue in data volume that packets carry. The time interval is for ACK dequeuing. $R_k(t)$ will be in this time interval.

If $V_k \geq R_k(t)$, the dequeue $R_k(t)$ from $V_k$. Rounding up is preferred. If $V_k < R_k(t)$, dequeue all ACK packets. Keep a timer on each ACK packet. If the timer expires, release this ACK. As ACKs are enqueued in First In First Out (FIFO), the timer expiration should also be FIFO. An exemplary default timer maybe 1000 ms.

Re-Classification of Priority for Flows

When a flow is re-classified, the ACKs may also flow with the reclassification. This means ACKs may be in different ACK queues before sending them out. Due to possibly different pacing rates of ACK queues, the ACKs may be out of order. ACKs being delivered out of order can have side effects of slowing down traffic. But this side effect should be temporary because the ACKs will be settled with a new pacing rate after re-classification.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

We claim as our invention:

1. A method for controlling congestion of traffic, by one of one or more User Terminals (UTs), traversing an intermediate node, the method comprising:
    associating, at the intermediate node, one or more traffic flows of a priority to one of the one or more UTs;
    detecting, at the intermediate node, a traffic congestion for the priority;
    performing Random Early Detection (RED) congestion control, at the intermediate node, for the priority to relieve the traffic congestion;
    selecting, for the priority, at the intermediate node, a User Terminal (UT) with a perceived delay greater than a high threshold; and
    controlling by priority at the intermediate node, congestion of a bottleneck link associated with the selected UT and obfuscated by the intermediate node,
    wherein the performing of the RED congestion control fails to relieve the traffic congestion for the priority, and
    the controlling comprises identifying a BBR flow from the traffic flows associated with the selected UT and controlling the BBR flow by shaping or pacing traffic associated with the BBR flow.

2. The method of claim 1, wherein the performing RED congestion control fails to decrease a rate of one of the traffic flows associated with the selected UT.

3. The method of claim 1, wherein at least one of the traffic flows associated with the selected UT comprises a Bottleneck Bandwidth and Round-trip propagation time (BBR) flow.

4. The method of claim 1, further comprising releasing the ACKs for the priority for a non-selected UT.

5. The method of claim 1, further comprising stopping the controlling for the priority when the perceived delay is less than a low threshold.

6. The method of claim 1, further comprising reentering the controlling when the perceived delay for the UT is greater than the high threshold.

7. The method of claim 1, wherein the controlling comprises:
    calculating a shaping factor and an available throughput by priority for the selected UT, and
    shaping the traffic flows associated with the selected UT based on the shaping factor and the available throughput rate for the priority.

8. The method of claim 1, wherein the controlling further comprises:
    queuing acknowledgment packets for the priority per UT of the one or more UTs,
    calculating an acknowledgment rate for the priority and a pacing factor for the selected UT, and
    sending the queued acknowledgment packets for the priority per UT of the one or more UTs based on the acknowledgment rate for the priority and the pacing factor for the selected UT.

9. The method of claim 1, wherein the intermediate node comprises one or more of a satellite gateway, a cellular base station, a Performance-Enhancing Proxy (PEP), a gateway for a communications link having a relatively larger latency than other communication links in a network, and a gateway for a communications link having a relatively smaller bandwidth than other communications links in a network.

10. A system comprising one or more User Terminals (UTs) and an intermediate node to control congestion to traffic, the one or more User Terminals (UTs), traversing the intermediate node, the intermediate node comprising:
- a flow scheduler to associate one or more traffic flows of a priority to one of the one or more UTs, and to detect a traffic congestion for the priority;
- a Random Early Detection (RED) congestion control to perform congestion control for the priority to relieve the traffic congestion;
- a BBR Congestion Control to select, for the priority, a User Terminal (UT) with a perceived delay greater than a high threshold; and
- a control module to control, by priority, congestion of a bottleneck link associated with the selected UT and obfuscated by the intermediate node,
- wherein the performing of the RED congestion control fails to relieve the traffic congestion for the priority, and
- the controlling comprises identifying a BBR flow from the traffic flows associated with the selected UT and controlling the BBR flow by shaping or pacing traffic associated with the BBR flow.

11. The system of claim 10, wherein the RED congestion control fails to decrease a rate of one of the traffic flows associated with the selected UT.

12. The system of claim 10, wherein at least one of the traffic flows associated with the selected UT comprises a Bottleneck Bandwidth and Round-trip propagation time (BBR) flow.

13. The system of claim 10, wherein the control module releases the ACKs for the priority for a non-selected UT.

14. The system of claim 10, wherein the control module stops the pacing for the priority when the perceived delay is less than a low threshold.

15. The system of claim 10, wherein the control module reenters the controlling when the perceived delay for the UT is greater than the high threshold.

16. The system of claim 10, wherein the control module calculates a shaping factor and an available throughput by priority for the selected UT, and
- shapes the traffic flows associated with the selected UT based on the shaping factor and the available throughput rate for the priority.

17. The intermediate node of claim 10, wherein the control module
- queues acknowledgment packets for the priority per UT of the one or more UTs,
- calculates an acknowledgment rate for the priority and a pacing factor for the selected UT, and
- sends the queued acknowledgment packets for the priority per UT of the one or more UTs based on the acknowledgment rate for the priority and the pacing factor for the selected UT.

18. The system of claim 10, wherein the intermediate node is implemented on one or more of a satellite gateway, a cellular base station, a Performance-Enhancing Proxy (PEP), a gateway for a communications link having a relatively larger latency than other communication links in a network, and a gateway for a communications link having a relatively smaller bandwidth than other communications links in a network.

* * * * *